United States Patent
Allpress

(10) Patent No.: US 9,143,244 B2
(45) Date of Patent: Sep. 22, 2015

(54) MITIGATING INTERFERENCE IN A WIRELESS COMMUNICATION SYSTEM

(71) Applicant: Nvidia Corporation, Santa Clara, CA (US)

(72) Inventor: Stephen A. Allpress, Bristol (GB)

(73) Assignee: Nvidia Corporation, Santa Clara, CA (US)

( * ) Notice: Subject to any disclaimer, the term of this patent is extended or adjusted under 35 U.S.C. 154(b) by 193 days.

(21) Appl. No.: 13/718,603

(22) Filed: Dec. 18, 2012

(65) Prior Publication Data
US 2013/0260806 A1 Oct. 3, 2013

(30) Foreign Application Priority Data
Apr. 3, 2012 (GB) .................................. 1205960.6

(51) Int. Cl.
H04B 1/00 (2006.01)
H04B 15/00 (2006.01)
H04B 1/04 (2006.01)
H04L 5/00 (2006.01)

(52) U.S. Cl.
CPC .............. *H04B 15/00* (2013.01); *H04B 1/0475* (2013.01); *H04L 5/001* (2013.01)

(58) Field of Classification Search
USPC ........ 455/63.1, 295, 302, 283, 304, 296, 303, 455/305; 370/345; 375/286, 222; 330/149, 330/151
See application file for complete search history.

(56) References Cited

U.S. PATENT DOCUMENTS

| | | | |
|---|---|---|---|
| 5,444,864 A | 8/1995 | Smith | |
| 7,043,208 B2 | 5/2006 | Nigra | |
| 8,487,678 B2 * | 7/2013 | Yang | 327/158 |
| 2004/0048576 A1 | 3/2004 | Hildebrand et al. | |
| 2007/0184782 A1 | 8/2007 | Sahota et al. | |
| 2009/0213770 A1 | 8/2009 | Mu | |
| 2010/0159837 A1 | 6/2010 | Dent et al. | |
| 2010/0159865 A1 * | 6/2010 | Fudge | 455/296 |
| 2010/0159866 A1 * | 6/2010 | Fudge et al. | 455/302 |

(Continued)

FOREIGN PATENT DOCUMENTS

WO 2011148341 A1 12/2011
WO 2013026038 A1 2/2013

OTHER PUBLICATIONS

"MOP and REFSENS Relaxation for Carrier Aggregation for Band 4 and Band 17," 3GPP TSG RAN WG4 Meeting #62, Motorola Mobility, AT&T, R4-120744, Feb. 6-10, 2012, 10 pages, Dresden, Germany.

(Continued)

*Primary Examiner* — Dominic E Rego

(57) ABSTRACT

A method of mitigating interference between carrier frequency bands of a carrier aggregation scheme. The method comprises: at a wireless device, receiving a first signal on a first carrier frequency band of the carrier aggregation scheme; mixing a second signal onto a second carrier frequency band of the carrier aggregation scheme and transmitting the second signal from the wireless device; executing code on a processing apparatus of the device to generate a reconstructed interference signal, by mixing an instance of the signal with a frequency location of an interfering harmonic from the second carrier frequency band falling in the first carrier frequency band; and removing the reconstructed interference signal from the first signal.

20 Claims, 1 Drawing Sheet

(56) References Cited

U.S. PATENT DOCUMENTS

| | | |
|---|---|---|
| 2011/0149714 A1 | 6/2011 | Rimini et al. |
| 2011/0158081 A1 | 6/2011 | Wang et al. |
| 2012/0182053 A1* | 7/2012 | Yang .............................. 327/119 |
| 2013/0023225 A1* | 1/2013 | Weber ........................... 455/296 |

OTHER PUBLICATIONS

Combined Search Report and Examination Report dated Sep. 16, 2013, Application No. GB1205960.6, Applicant: Nvidia Corporation, 9 pages.

* cited by examiner

MITIGATING INTERFERENCE IN A WIRELESS COMMUNICATION SYSTEM

CROSS REFERENCES TO RELATED APPLICATION

This application claims priority from GB Application No. 1205960.6 filed on Apr. 3, 2012, entitled "Mitigating Interference in a Wireless Communication System," by Stephen Allpress. The above application is commonly assigned with this application and is incorporated herein by reference in its entirety.

TECHNICAL FIELD

The disclosure relates to the issue of interference between bands of a carrier aggregation scheme.

BACKGROUND

The allocation of spectrum resources in a wireless communication system needs to be carefully managed, particularly in a cellular communication network. An example of such a network operates according to one or more of the 3GPP standards (Third Generation Partnership Project). A particular standard may also be referred to as a "radio access technology". In such systems, a plurality of carrier frequency bands ("carriers") are made available for communication between devices. In the case of a cellular network an allocated carrier can be used to communicate on the uplink and downlink between a mobile user terminal and a base station (also called a "Node-B" in 3 G terminology). For example in the latest LTE (Long Term Evolution) standards of 3GPP there are defined bands 1 to 17 as will be familiar to a person skilled in the art. 3GPP also covers LTE Advanced standards or "4 G".

Within a given carrier, one or more mobile user terminals can communicate uplink and/or downlink signals on the allocated carrier. Multiple such signals can be multiplexed onto the same carrier using one or more of: time division multiplexing whereby each signal is given a different respective time slot, code division multiplexing whereby each signal is spread by a different respective spreading code, and/or orthogonal frequency division multiplexing whereby a carrier is divided into a plurality of subcarriers.

Aside from this, some modern standards also allow for a technique known as carrier aggregation, whereby a given device is enabled to communicate using an aggregate of multiple carriers (not just subcarriers, but multiple carriers, typically being the largest unit of frequency band used in the radio access technology in question). The component carriers forming the aggregate may be contiguous or may not. For example carrier aggregation is enabled in LTE Advanced, but not regular LTE standards.

In order to make use of the aggregated carrier, a device is configured according to a suitably advanced radio access technology. Typically a user terminal configured according to an earlier radio access technology will only be able to access each carrier band as a separate, individual band, and may only be allocated one single carrier for use at any one time. A user terminal configured according to a later radio access technology on the other hand may be enabled to aggregate two or more carriers for use together simultaneously. For example, to an LTE terminal, each component carrier appears as a separate, individual LTE carrier and may only be used one at a time; while an LTE-Advanced terminal can exploit the total aggregated bandwidth of the two or more component carriers. Using LTE Advanced carrier aggregation, it is possible to utilise more than one carrier and in this way increase the overall transmission bandwidth.

However, interference can occur between the bands of the aggregated carrier scheme.

For example one particular problem occurs with the receiver sensitivity degradation in an LTE carrier aggregation (CA) system where band 4 (2100 MHz) and band 17 (700 MHz) are the two frequency bands that are used. This is particularly important for North America. The problem is that the band 17 uplink generates third-harmonic products that fall into the band 4 downlink. As a result, particularly at high transmit powers, the sensitivity of the band 4 receiver is degraded.

Attempts have been made to suppress this harmonic interference using hardware filters. However, this "brute force" approach has met with limited success. For example the designer tries to suppress the interference at one location only to find it reappear at another. Given the difficulties with such interference, proposals have been made to circumvent the problem by placing constraints on maximum power output and relaxing sensitivity requirements. Reference is made to 3GPP publication R4-120744 (3GPP TSG RAN WG4 Meeting #63, Dresden, Germany, 6-10 Feb. 2012, agenda item 6.10.1, "MOP and REFSENS Relaxation for Carrier Aggregation for Band 4 and 17).

SUMMARY

According to one aspect of the disclosure, there is provided a method of mitigating interference between carrier frequency bands of a carrier aggregation scheme. In one embodiment, the method includes: at a wireless device, receiving a first signal on a first carrier frequency band of the carrier aggregation scheme; mixing a second signal onto a second carrier frequency band of the carrier aggregation scheme and transmitting the second signal from said device; executing code on a processing apparatus of the device to generate a reconstructed interference signal, by mixing an instance of the second signal with a frequency location an interfering harmonic from the second carrier frequency band falling in the first carrier frequency band; and removing the reconstructed interference signal from the first signal.

According to another aspect of the disclosure, there is provided a computer program product. In one embodiment, the computer program product code includes code embodied on a computer-readable medium and configured so as when executed on a processing apparatus of a wireless device to perform operations in accordance with any of the methods described herein.

According to another aspect of the disclosure, there is provided a wireless device. In one embodiment, the wireless device includes: a receiver arranged to receive a first signal on a first carrier frequency band of a carrier aggregation scheme; a transmitter arranged to transmit a second signal mixed onto a second carrier frequency band of the carrier aggregation scheme; a storage device storing signal processing code; and processing apparatus coupled to the transmitter, receiver and storage device, arranged to execute the signal processing code; the signal processing code being configured so as when executed on the processing apparatus to generate a reconstructed interference signal by mixing an instance of the second signal with a frequency location of an interfering harmonic from the second carrier frequency band falling in the first carrier frequency band, and to remove the reconstructed interference signal from the first signal.

In embodiments the wireless device may be further configured in accordance with any of the above method features.

BRIEF DESCRIPTION OF THE DRAWINGS

For a better understanding of the embodiments disclose herein and to show how it may be put into effect, reference is made by way of example to the accompanying drawings in which.

DETAILED DESCRIPTION

As noted above, the disclosure provides a method of mitigating interference between carrier frequency bands of a carrier aggregation scheme that includes generating a reconstructed interference signal. The reconstructed signal provides an estimate of the interference which can be removed from a received signal, substantially reducing the effect of the interference.

In embodiments of the method, a harmonic is a product of a frequency of the second carrier frequency band, and the location at which the harmonic falls within the first carrier frequency band is the frequency of the second carrier frequency band multiplied by said product, minus a frequency of the first carrier frequency band. For example, said product may be three, and for example, the first carrier frequency band may be 3GPP band 4 located at 2100 MHz and the second frequency band may be 3GPP band 17 located at 700 MHz.

In embodiments, the generating of the reconstructed interference signal may comprise tuning a gain of the reconstructed interference signal.

In embodiments, the gain may be determined by maximising a signal-to-noise ratio of the first signal after the reconstructed interference signal has been removed.

In embodiments, the generating of the reconstructed interference signal may comprise tuning a timing of the reconstructed interference signal. For example, the tuning of the timing may comprise tuning a delay, tuning a phase, or tuning both a delay and a phase. The timing may be determined by maximising a signal to noise ratio of the first signal after the reconstructed interference signal has been removed.

In embodiments, the instance of the second signal may be taken from a stage prior to being mixed onto the second carrier frequency band.

In embodiments, the wireless device may be a user terminal, wherein the first signal may be a downlink signal and the second signal may be an uplink signal.

To mitigate the problem of interference between carriers, the following embodiments reconstruct an estimate of the interfering signal and subtract this from the band 4 downlink signal before the standard receiver processing is employed. The frequency location is known ($3f_{UL}$-$f_{DL}$), the phase shift is estimated, the gain is estimated and the time delay is also estimated. Phase shift, gain and time delay can all be derived using tracking loops that maximize the SNR (signal-to-noise ratio) of the signal after the interfering signal has been subtracted.

Figure 1:
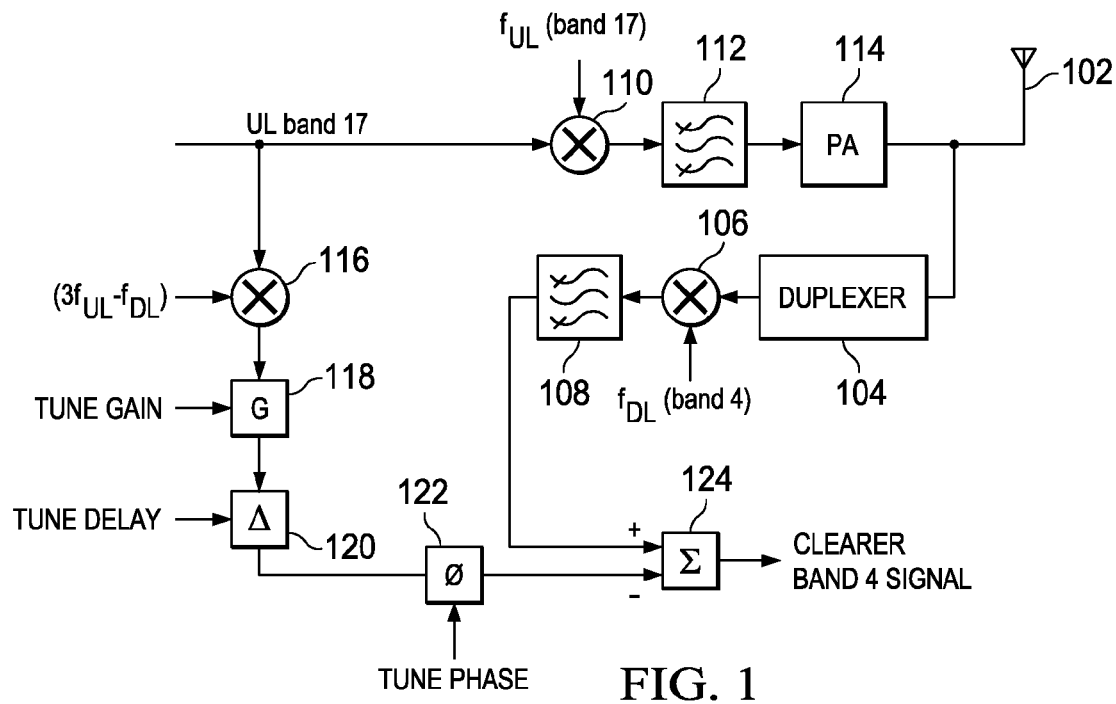
FIG. 1 is a schematic illustration of a wireless communication device.

FIG. 1 is a schematic diagram of a wireless communication device according to embodiments provided herein. The device may take the form of a mobile user equipment for use in a wireless communication system, for communicating with a base station of a wireless cellular network.

The device comprises at least one antenna 102 coupled to a first, receiving branch and a second, transmitting branch. The receiving branch comprises a duplexer 104 coupled to the antenna 102, and also a first mixer 106 and first filter 108. The receiving branch is arranged to receive a first signal over a wireless communication system (e.g. cellular network). The receiving branch is coupled between the antenna 102 and a subtraction stage 124, where the reconstructed interference is to be removed from the first signal. The output of the subtraction stage couples onwards to a subsequent signal processing stage. The transmit branch is arranged to transmit a second signal over the wireless communication system (e.g. cellular network). The transmit branch comprises a second mixer 110 and second filter 112, and a power amplifier 114 coupled to the antenna 102. The transmit branch is coupled between an output from a preceding signal processing stage and the antenna 102, the output from the earlier signal processing stage being arranged to supply the second signal to the transmit branch in order be transmitted.

In the arrangement shown, on the receive branch the first mixer 106 has an input coupled to an output of the duplexer 104, the first filter 108 has an input coupled to an output of the first mixer 106, and the first filter 108 has an output coupled to one input of the subtraction stage 124. On the transmit branch the second mixer 110 has an input coupled to the output from the earlier signal processing stage, the second filter 112 has an input coupled to an output from the second mixer 110, the power amplifier 114 has an input coupled to an output of the second filter 112. In other embodiments however the components may be arranged in a different order and/or one or more additional stages such as additional filer and/or mixer stages may be present along the receive branch and/or transmit branch.

The first mixer 106 also has an input arranged to receive a first frequency being a frequency of a first carrier frequency band. The second mixer 110 has an input arranged to receive a second frequency being a frequency of a second carrier frequency band.

In the case of a wireless user terminal communicating with a base station of a wireless cellular network, the first signal is a downlink signal (received by the user terminal from the base station) and the second signal is an uplink signal (transmitted from the user terminal to the base station). The first frequency ($f_{DL}$) is the frequency of a first carrier which according to an exemplary carrier aggregation scheme is used by the user terminal to receive the downlink signal; and the second frequency ($f_{UL}$) is the frequency of a second, different carrier used at the same time by the same user terminal to transmit the uplink signal.

Note that a band has a frequency location and a width, e.g. the location may be considered in terms of a mid frequency of the band or one or both of its boundaries. The frequency input to the mixers 106 and 110 may set the location.

In an application, the first (downlink) carrier is band 4 of the 3GPP standards and the second (uplink) carrier is band 17 of the 3GPP standards. Band 4 is located at approximately 2100 MHz on the downlink and Band 17 is located at approximately 700 MHz on the uplink. Because the user terminal is using both Band 4 and Band 7 at the same time as enabled by the LTE Advanced standards, it may be said to use an aggregate CA__4+17.

The wireless device (e.g. user terminal) further comprises a harmonic interference cancellation branch, comprising a third mixer 116, gain stage 118, delay stage 120, and phase offset stage 122. The harmonic interference cancellation branch has one end arranged to receive an instance of the signal to be transmitted (the second signal) from the preceding signal processing stage. The instance supplied along the interference cancellation branch is taken prior to the second signal being mixed by the second mixer 110 or filtered by the second filter 112. The other end of the interference cancellation branch is coupled to the other input of the subtraction stage 124.

In the arrangement shown, the third mixer 116 has an input arranged to receive the instance of the second signal from the preceding signal processing stage, the gain stage 118 has an input coupled to an output of the third mixer 116, the delay stage 120 has an input coupled to an output of the gain stage 118, and the phase offset stage 122 has an input coupled to an output of the delay stage 120 and an output coupled to the relevant input of the subtraction stage 124. However, in other embodiments the third mixer 116, gain stage 118, delay stage 120 and phase offset stage 122 may be arranged in any order along the harmonic interference cancellation branch.

The third mixer 116 has another input arranged to receive a third frequency, being an indication of a location of the interfering harmonic within the first carrier. The interference results from a harmonic of the second signal being transmitted on the second carrier. For the $n^{th}$ harmonic the location is $nf_{UL}-f_{DL}$ So in the case of a third-harmonic product, the frequency input to the third mixer 116 is $3f_{UL}-f_{DL}$. Further, the gain stage 118 has another input arranged to receive a gain signal, the delay stage 120 has another input arranged to receive a delay signal, and the phase offset stage 122 has another input arranged to receive a phase offset signal. The operation of the harmonic interference cancellation branch will be discussed in more detail shortly.

Figure 2:
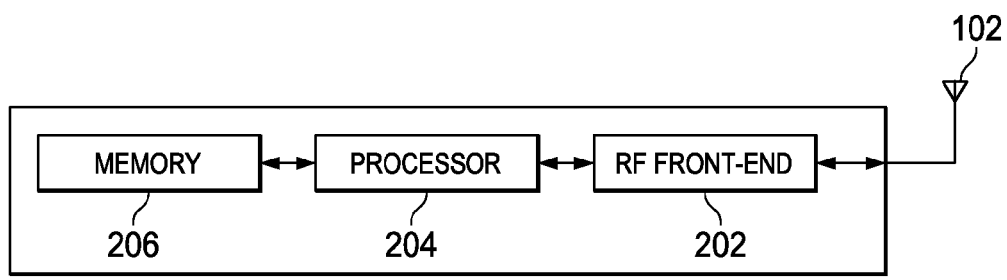
FIG. 2 is a schematic block diagram of the wireless communication device.

FIG. 2 gives another schematic illustration of the wireless device. The device comprises the antenna 102; an RF front-end 202 coupled to the antenna 102; a processing apparatus 204 in the form or a processor having one or more cores, coupled to the RF-front end 202; and a storage device 206 comprising one or more storage media, e.g. a magnetic memory such as a hard drive and/or an electronic memory such as a flash memory, coupled to the processor 204. The memory 206 may comprise and internal memory of the wireless device and/or an external memory connected to the wireless device.

The RF front-end 202 comprises the power amplifier 114 and the duplexer 104. Each of the first mixer 106, first filter 108, second mixer 110, second filter 112, third mixer 116, gain tuning 118, delay stage 120, phase offset stage 122 and subtraction stage 124 of FIG. 1 may be implemented in signal processing code (software) stored on the memory 206 and arranged for execution on the wireless device, or alternatively may be implemented in dedicated hardware, or a combination of these.

The signal processing code also comprises the signal processing stages arranged to generate the signal to be transmitted (the second signal) for supply to the second filter 110 and third filter 116, and to process the received signal (first signal) as output from the subtraction stage 124. The code stored further comprises control code configured to generate the frequency location ($3f_{UL}-f_{DL}$) supplied to the third mixer 116, the gain signal supplied to the gain stage 118, the delay signal supplied to the delay stage 120 and the phase signal supplied to the phase offset stage 122, as well as supplying an indication of the frequency of the first frequency band to the relevant input of the first mixer stage 106, and an indication of the frequency of the second frequency band to the relevant input of the second mixer stage 110. Each of these items of code (software) is also arranged for execution on the processor 204.

In operation the described elements are configured to act as follows. The transmit branch (comprising the second mixer 110, second filter 112 and power amplifier 114) receives the signal to be transmitted (the second signal) from the preceding signal processing stage. The second mixer 110 mixes this second signal with the frequency of the uplink carrier (the second carrier), which in the noted application is Band 17 at 700 MHz, thereby modulating it onto the second, uplink carrier. The filter 112 also filters the signal, and the modulated, filtered signal is transmitted via the power amplifier 114 and antenna 102 on the second carrier. In addition, the receive branch (comprising the duplexer 104, first mixer 106 and first filter 108) receives the first signal via the antenna 102 and duplexer 104. The first mixer 106 demodulates this first signal according to the frequency of the first carrier, which in the discussed application is Band 4 at 2100 MHz. The first filter 108 also filters the first signal, and the demodulated, filtered first signal is supplied via the subtraction stage 124 to the onward signal processing stage.

However, the transmission of the second signal on the second carrier will tend to interfere with the reception of the first signal on the first carrier, particularly at transmission high powers. The interference is due to a harmonic of the second signal as transmitted on the second carrier, which occurs at a multiple of the frequency of the second carrier. One such harmonic occurs at three times the second (uplink) carrier frequency, so if the first (downlink) carrier has a frequency three times that of the second (uplink) carrier (e.g. 2100 MHz being three times 700 Mhz) then a harmonic at three times the second carrier frequency will interfere with the first signal on the first carrier.

The harmonic interference cancellation branch acts to reconstruct an estimate of the interference. It does this by receiving an indication of the frequency location of the relevant harmonic at one of the inputs of the third mixer 116, so as to mix the instance of the second (uplink) signal with the frequency of the harmonic and thereby create a reconstructed version of the interference. For the $n^{th}$ product harmonic the frequency location of the interference will be $nf_{UL}-f_{DL}$. So in the case of a third-harmonic product, the frequency input to the third mixer 116 is $3f_{UL}-f_{DL}$. This frequency may be predetermined based on the knowledge of the communication system (e.g. based on the 3GPP specification).

The selection of whether and when to apply the harmonic interference cancellation branch is controlled by the control code stored on the memory 206 and executed on the processor 204, in dependence on whether the carrier aggregation is currently being used by the wireless device, and if so using which carriers. The frequency location of the harmonic ($3f_{UL}-f_{DL}$) may also be supplied to the mixer by the executed control code (though if the location of the harmonic is predetermined it need not explicitly perform the calculation to do so—instead the frequency location used to control the third mixer 116 may be pre-stored).

When executed, the control code also supplies a gain signal to the gain stage 118 on the interference cancellation branch in order to tune the magnitude of the reconstructed interference signal. Further, the executed control code supplies a delay signal to the delay stage 118 and a phase offset signal to the phase offset stage 122, thereby tuning the timing of the reconstructed interference signal. The reconstructed, tuned interference signal is then subtracted from the first signal by means of the subtraction stage 124. The executed control code performs the tuning of the gain, delay and phase by using one or more tracking loops that are configured to maximise the SNR (Signal-to-Noise ratio) of the first (downlink) signal after the interfering signal has been subtracted.

The version of the first signal with this estimated interference removed is then supplied onwards to the subsequent signal processing stage for further receive processing, e.g. so as to play out a received audio and/or video signal from a speaker and/or screen of the user terminal.

It will be appreciated that the above embodiments have been described only by way of example. For instance, the embodiments disclosed herein may find an application cancelling interference between other carriers, and/or in may be used in relation to other carrier aggregation schemes of other types of radio access technologies or types of communication systems. Further, in less preferred embodiments, any or all of the magnitude, delay and phase of the reconstructed interference may be fixed or determined by other means, and/or the delay and phase could be combined into the same timing tuning. In the preferred embodiments where the gain, delay and/or phase of the reconstructed interference is determined by maximising signal to noise ratio, note also this can refer to any measure of signal strength of the desired signal relative to undesired contributions. The term noise as used herein may refer to random noise and/or interference. Further, the reconstructed interference could be removed from the first signal by other means than a subtraction, e.g. by controlling an adaptive software filter in dependence on the reconstructed interference. The disclosure is not limited by the described embodiments but only by the accompanying claims.

The invention claimed is:

1. A method of mitigating interference between carrier frequency bands of a carrier aggregation scheme, the method comprising:
   at a wireless device, receiving a first signal on a first carrier frequency band of the carrier aggregation scheme;
   mixing a second signal onto a second carrier frequency band of the carrier aggregation scheme and transmitting the second signal from said device;
   executing code on a processing apparatus of the device to generate a reconstructed interference signal, by mixing an instance of the second signal with a frequency location of an interfering harmonic from the second carrier frequency band falling in the first carrier frequency band; and
   removing the reconstructed interference signal from the first signal.

2. The method of claim 1, wherein the harmonic is a product of a frequency of the second carrier frequency band, and the location at which the harmonic falls within the first carrier frequency band is the frequency of the second carrier frequency band multiplied by said product, minus a frequency of the first carrier frequency band.

3. The method of claim 2, wherein said product is three.

4. The method of claim 3, wherein the first carrier frequency band is 3GPP band 4 located at 2100 MHz and the second frequency band is 3GPP band 17 located at 700 MHz.

5. The method of claim 1, wherein the generating of the reconstructed interference signal comprises tuning a gain of the reconstructed interference signal.

6. The method of claim 1, wherein the gain is determined by maximising a signal-to-noise ratio of the first signal after the reconstructed interference signal has been removed.

7. The method of claim 1, wherein the generating of the reconstructed interference signal comprises tuning a timing of the reconstructed interference signal.

8. The method of claim 7, wherein the tuning of the timing comprises tuning a delay.

9. The method of claim 7, wherein the tuning of the timing comprises tuning a phase.

10. The method of claim 7, wherein the tuning of the timing comprises tuning both a delay and a phase.

11. The method of claim 7, wherein the timing is determined by maximising a signal to noise ratio of the first signal after the reconstructed interference signal has been removed.

12. The method of claim 1, wherein the instance of the second signal is taken from a stage prior to being mixed onto the second carrier frequency band.

13. The method of claim 1, wherein said wireless device is a user terminal, the first signal being a downlink signal and the second signal being an uplink signal.

14. A computer program product for mitigating interference between carrier frequency bands of a carrier aggregation scheme, the computer program product comprising code embodied on a non-transitory computer-readable storage medium and configured so as when executed on a processing apparatus of a wireless device to perform operations of:
   at the wireless device, receiving a first signal on a first carrier frequency band of the carrier aggregation scheme;
   mixing a second signal onto a second carrier frequency band of the carrier aggregation scheme and transmitting the second signal from said device;
   generating a reconstructed interference signal, by mixing an instance of the second signal with a frequency location an interfering harmonic from the second carrier frequency band falling in the first carrier frequency band; and
   removing the reconstructed interference signal from the first signal.

15. A wireless device comprising:
   a receiver arranged to receive a first signal on a first carrier frequency band of a carrier aggregation scheme;
   a transmitter arranged to transmit a second signal mixed onto a second carrier frequency band of the carrier aggregation scheme;
   a storage device storing signal processing code; and
   processing apparatus coupled to the transmitter, receiver and storage device, arranged to execute the signal processing code; the signal processing code being configured so as when executed on the processing apparatus to generate a reconstructed interference signal by mixing an instance of the second signal with a frequency location of an interfering harmonic from the second carrier frequency band falling in the first carrier frequency band, and to remove the reconstructed interference signal from the first signal.

16. The wireless device according to claim 15, wherein the harmonic is a product of a frequency of the second carrier frequency band, and the location at which the harmonic falls within the first carrier frequency band is the frequency of the second carrier frequency band multiplied by said product, minus a frequency of the first carrier frequency band.

17. The wireless device according to claim 15, wherein the to generate the reconstructed interference signal includes tuning a gain of the reconstructed interference signal.

18. The wireless device according to claim 15, wherein the to generate the reconstructed interference signal includes tuning a timing gain of the reconstructed interference signal.

19. The wireless device according to claim 15, wherein the instance of the second signal is taken from a stage prior to being mixed onto the second carrier frequency band.

20. The wireless device according to claim 15, wherein said wireless device is a user terminal, the first signal being a downlink signal and the second signal being an uplink signal.

* * * * *